June 16, 1953  J. F. NAYLOR  2,642,178
CONVEYER APPARATUS
Filed June 12, 1950  2 Sheets-Sheet 1

Inventor
JOSEPH FRANCIS NAYLOR
Attorney

June 16, 1953 J. F. NAYLOR 2,642,178
CONVEYER APPARATUS
Filed June 12, 1950 2 Sheets—Sheet 2

Inventor
JOSEPH FRANCIS NAYLOR

Patented June 16, 1953

2,642,178

UNITED STATES PATENT OFFICE 2,642,178

CONVEYER APPARATUS

Joseph Francis Naylor, Newton-le-Willows, England, assignor to T. & T. Vicars Limited, Earlestown, Newton-le-Willows, England, a British company Application June 12, 1950, Serial No. 167,667
In Great Britain June 13, 1949

8 Claims. (Cl. 198—165)

This invention concerns the conveying of fragile articles, such as biscuits, from one level to another level.

An object of the invention is to provide an arrangement which will give a good increase of height with economy of space in a horizontal direction.

According to the present invention, an apparatus for conveying fragile articles, such as biscuits, from one level to another level is provided in which the articles are conveyed between two conveyor belts in a curved path defined in part by a deflector plate having a larger radius and in part by at least one set of resilient rollers made of a resilient material such as rubber grouped in a curve of a smaller radius. Preferably the deflector plate defines the greater part of the length of said curved path whilst said resilient rollers define a change in direction of said path which is at least as great as the change in direction defined by the deflector plate. The total change in direction of the curved path may be such that the articles may be transferred from a substantially horizontal position at the one level to a substantially horizontal position at the other level.

If desired a plurality of such conveying means may be disposed in series, the terminal point of one curved path being arranged in operative relationship to the next successive curved path so that the biscuits may be transferred from one to another.

The invention will be described further, by way of example, with reference to the accompanying drawings in which.

Figure 1:
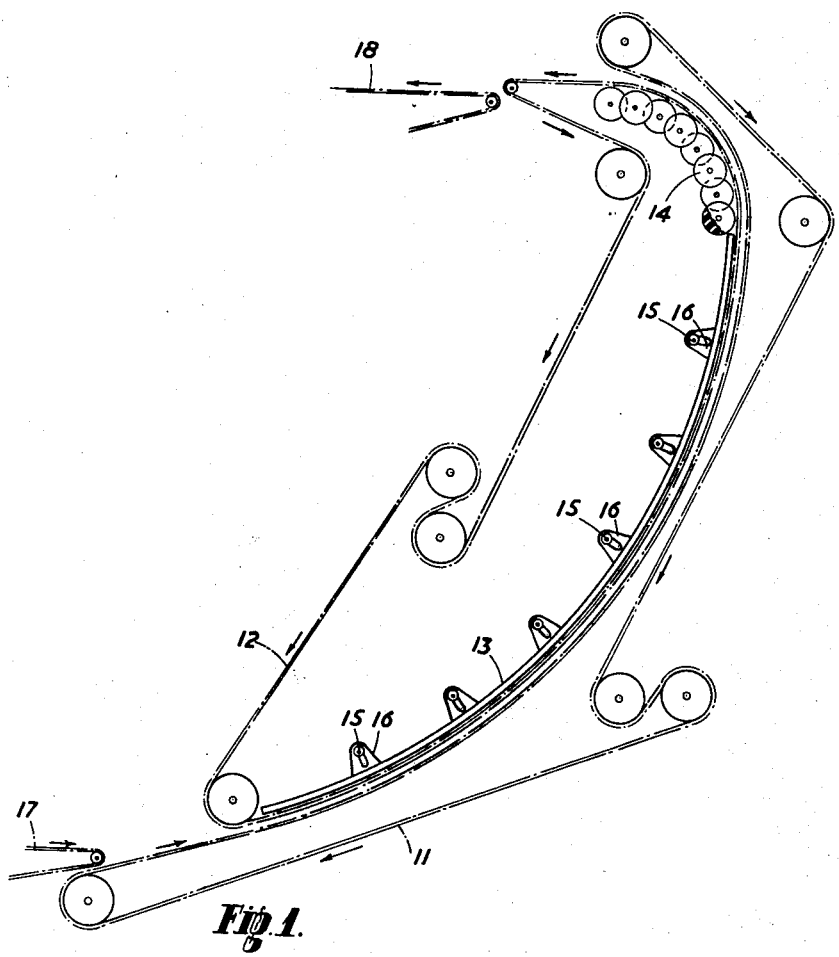
Fig. 1 is a diagrammatic side elevation of a conveyor apparatus constructed according to the invention.

Referring to Fig. 1, an endless conveyor belt 11 passes round a series of suitably disposed rollers in the direction shown by the arrows. A second conveyor belt 12 passes round a second series of rollers in the direction indicated by the arrows. A deflector plate 13 which may be adjustably secured to a fixed structure by bolts 15 passing through suitably slotted brackets 16 forming part of the deflector plate 13 defines part of a curved path which adjacent parts of the conveyor belts 11 and 12 are constrained to follow. The remainder of the curved path is defined by a series of resilient rollers 14.

The deflector plate 13 defines the greater part of the length of the curved path but the change in direction defined by the rollers 14 is at least as great as that defined by the deflector plate 13.

A delivery conveyor 17 is adapted to supply fragile articles such as biscuits to a predominantly horizontal portion of the conveyor 11 just before this conveyor begins to move upwardly along the curved path. Similarly a receiving conveyor 18 is adapted to receive articles as they emerge at the upper end of the curved path.

The curve defined by the deflector plate 13 is comparatively gradual in order to avoid the possibility of damage to the articles and would not be sufficient to turn the articles through as much as two right angles if economy of horizontal space is to be effected. The second part of the curved path, however, defined by the resilient rollers 14 is comparatively short in length although causing the biscuits to be turned through at least as great an angle as when they are conveyed along that part of the curve defined by the deflector plate 13. The resilient rollers 14 may be each made up of a spindle carrying a number of spaced resilient discs made of a resilient material such as rubber. The discs of adjacent shafts may be staggered with respect to one another to enable the spindles to be disposed apart by a distance less than the diameter of the discs. This roller construction provides a great amount of resilient cushioning and enables articles to be conveyed in a path of relatively small radius of curvature without danger of damage occurring to them. The conveyor belts 11, 12 themselves may be formed of flexible and resilient material.

In operation biscuits conveyed by conveyor belt 17 fall on to the lower portion of conveyor belt 11 and enter the bight between the belts 11 and 12 as they are constrained to move along the curved path defined by the deflector plate 13. They move upwardly along the curved path smoothly and without damage until they reach a substantially vertical position at the point where the resilient rollers begin. Thereafter they are turned quickly through approximately 90° to emerge substantially horizontal and eventually fall on to conveyor belt 18 to be carried away.

Figure 2:
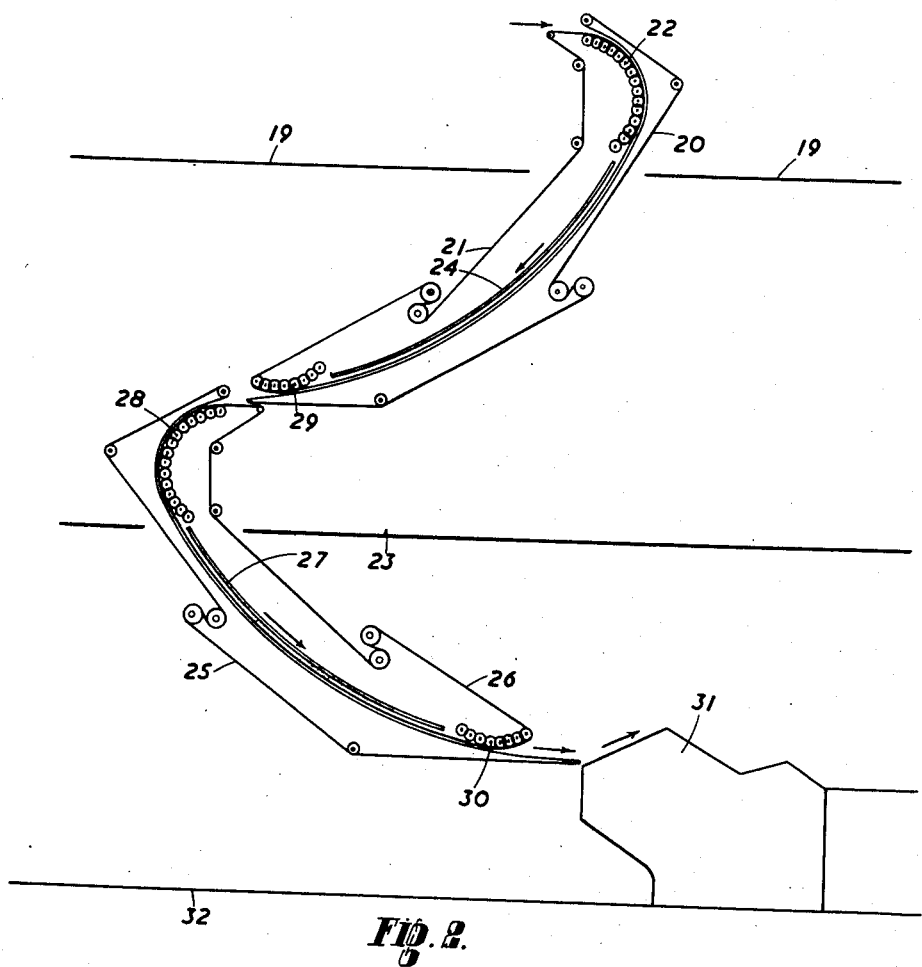
Fig. 2 is a diagrammatic side elevation of a conveyor apparatus comprising two consecutively disposed conveyor means.

In Fig. 2 two similar conveying means are disposed in series in this case to cause the articles to descend from a higher level to a lower one. It is obvious that the apparatus is reversible in purpose.

In this embodiment biscuits which may be on the second floor 19 of a building are fed, substantially horizontally, between two conveyor belts 20, 21 which are constrained to move in a curved path. The initial part of the curved path is defined by a series of resilient rollers 22 and defines a change in direction of approximately 90°. The conveyer belts 20, 21 then pass from the second floor to the first floor 23 along a curved path of comparatively large radius of curvature and defined by a stationary deflector plate 24. They are delivered from the two conveyor belts 20, 21 at working height on the first floor 23 and fed to a similar system substantially horizontally which conveys the biscuits to, for instance, a stacking machine 31 on the ground floor 32. This system comprises conveyor belts 25, 26, deflector plate 27 and resilient rollers 28.

Resilient rollers 29, 30 may define the terminal points of the upper and lower curved paths respectively in order to reduce the risk of breakage of articles on emergence.

I claim:

1. An apparatus for conveying fragile articles from one level to another level comprising in combination two conveyor belts adapted for carrying said articles therebetween, a deflector plate defining part of a curved path in which said conveyor belts are constrained to move, and a set of resilient rollers defining the remainder of said curved path, said rollers being grouped in a curve of smaller radius than that part of the curved path defined by said deflector plate.

2. An apparatus for conveying fragile articles from one level to another level comprising in combination two conveyor belts adapted for carrying said articles therebetween, a deflector plate defining the greater part of the length of a curved path in which said conveyor belts are constrained to move, and a set of resilient rollers defining the remainder of said curved path, the change in direction of said remainder being at least as great as the change in direction of that part of the curved path defined by the deflector plate.

3. An apparatus for conveying fragile articles from one level to another level comprising in combination two conveyor belts adapted for carrying said articles therebetween, a deflector plate defining the greater part of the length of a curved path in which said conveyor belts are constrained to move, and a set of resilient rollers, defining the remainder of said curved path, the change in direction of said remainder being at least as great as the change in direction of that part of the curved path defined by the deflector plate, and the total change in direction of said curved path being substantially two right angles.

4. An apparatus for conveying fragile articles from one level to another level comprising in combination two conveyor belts adapted for carrying said articles therebetween, a deflector plate defining the greater part of the length of a curved path in which said conveyor belts are constrained to move, and a set of rollers, each of said rollers consisting of a spindle supporting a series of spaced resilient discs, the spacing of said discs on adjacent spindles being staggered to allow said spindles to be spaced apart by a distance less than the diameter of said discs, said rollers defining the remainder of said curved path, the change in direction of said remainder being at least as great as the change in direction of that part of the curved path defined by the deflector plate, and the total change in direction of said curved path being substantially two right angles.

5. An apparatus for conveying fragile articles from one level to another level comprising in combination a plurality of conveying means, each of said conveying means consisting of two conveyor belts adapted for carrying said articles therebetween, a deflector plate defining a greater part of the length of a curved path in which said conveyor belts are constrained to move, and a set of resilient rollers, defining the remainder of said curved path, the change in direction of said remainder being at least as great as the change in direction of that part of the curved path defined by the deflector plate, and the total change in direction of said curved path being substantially two right angles.

6. An apparatus for conveying fragile articles from one level to another level comprising in combination a plurality of conveying means disposed in successive operational relationship, each of said conveying means consisting of two conveyor belts adapted for carrying said articles therebetween, a deflector plate defining a greater part of the length of a curved path in which said conveyor belts are constrained to move, and a set of resilient rollers, defining the remainder of said curved path, the change in direction of said remainder being at least as great as the change in direction of that part of the curved path defined by the deflector plate, and the total change in direction of said curved path being substantially two right angles.

7. An apparatus for conveying fragile articles from one level to another level, comprising in combination a plurality of conveying means disposed in successive operational relationship, each of said conveying means consisting of two conveyor belts adapted for carrying said articles therebetween, a deflector plate defining a greater part of the length of a curved path in which said conveyor belts are constrained to move, and a set of rollers, each of said rollers consisting of a spindle supporting a series of spaced resilient discs, the spacing of discs on adjacent spindles being staggered to allow said spindles to be spaced apart by a distance less than the diameter of said discs, said rollers defining the remainder of said curved path, the change in direction of said remainder being at least as great as the change in direction of that part of the curved path defined by the deflector plate, and the total change in direction of said curved path being substantially two right angles.

8. An apparatus for conveying fragile articles from one level to a higher level, comprising in combination a pair of conveyor bands having opposed adjacent runs to carry said articles therebetween, a convex deflector plate adjacent to one of said belts and defining part of said runs, and a plurality of resilient rollers disposed in a curve of smaller radius than the curve of the deflector plate and adjacent to said one belt and defining another part of said runs.

JOSEPH FRANCIS NAYLOR.

References Cited in the file of this patent

UNITED STATES PATENTS

| Number | Name | Date |
|---|---|---|
| 733,804 | Blaisdell | July 14, 1903 |
| 1,591,347 | Van Allen | July 6, 1926 |
| 2,539,524 | Rixon | Jan. 30, 1951 |